(12) United States Patent
Ray

(10) Patent No.: US 7,273,245 B2
(45) Date of Patent: Sep. 25, 2007

(54) CAMPER AND TRAILER COMBINATION HAVING COLLAPSIBLE CANOPY

(76) Inventor: John Robert Ray, 138 Haley Way, Maryville, TN (US) 37801

( * ) Notice: Subject to any disclaimer, the term of this patent is extended or adjusted under 35 U.S.C. 154(b) by 131 days.

(21) Appl. No.: 10/929,908

(22) Filed: Aug. 30, 2004

(65) Prior Publication Data

US 2006/0043768 A1    Mar. 2, 2006

(51) Int. Cl.
*B60P 3/34* (2006.01)
(52) U.S. Cl. .................. 296/163; 296/105; 296/173
(58) Field of Classification Search .............. 296/105, 296/173, 180, 163, 100.12, 100.14; 135/88.01, 135/88.09
See application file for complete search history.

(56) References Cited

U.S. PATENT DOCUMENTS

| 849,675 A | * | 4/1907 | Gilleland et al. | .......... 296/105 |
| 1,856,280 A | * | 5/1932 | Helms | .................... 296/100.14 |

\* cited by examiner

*Primary Examiner*—Stephen Gordon
(74) *Attorney, Agent, or Firm*—Michael E. McKee

(57) ABSTRACT

A camper and trailer combination includes an open-topped, wheeled enclosure, a plurality of spars which span the open top of the enclosure, a canopy which is positionable over the spars to cover the open top of the enclosure. The spars are connected to the open-topped enclosure to permit a movement of the spars between an upright condition at which the canopy can be spread over and cover the spars and a collapsed, out-of-the-way condition.

13 Claims, 4 Drawing Sheets

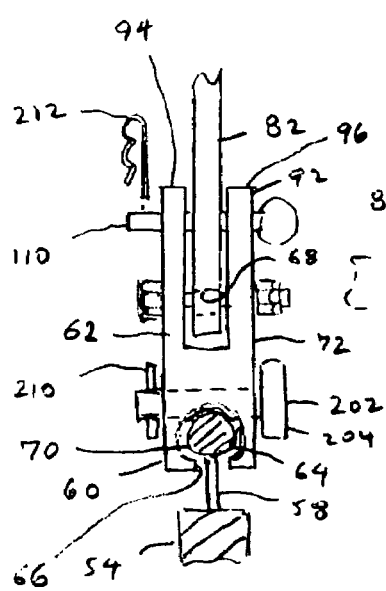
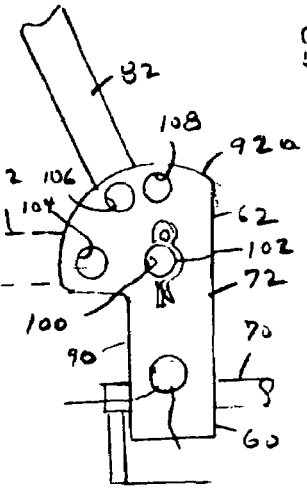
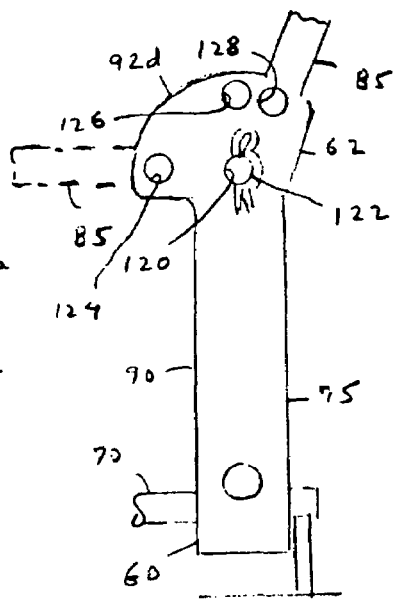
FIG. 6　　　　FIG. 7　　　　FIG. 8
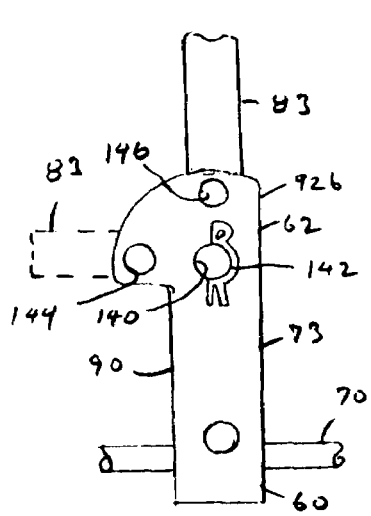
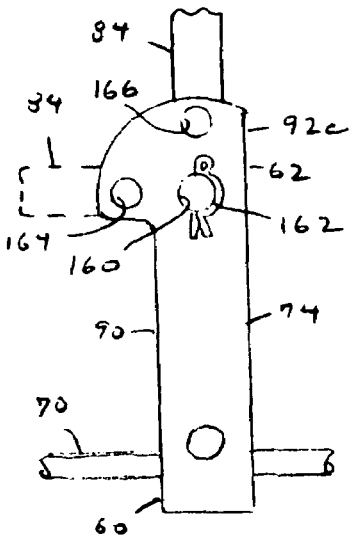
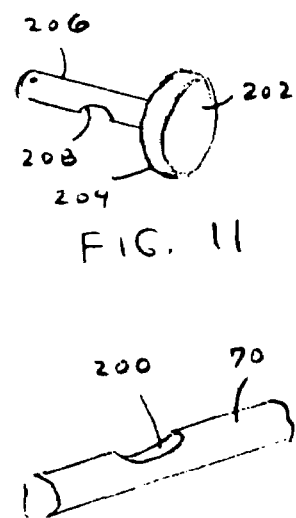
FIG. 9　　　　FIG. 10
FIG. 11
FIG. 12
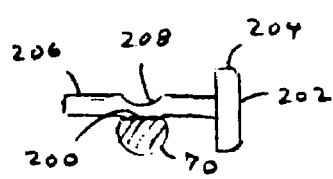
FIG. 13

CAMPER AND TRAILER COMBINATION HAVING COLLAPSIBLE CANOPY

BACKGROUND OF THE INVENTION

This invention relates generally to campers and relates, more particularly, to a camper which can serve as a utility trailer, as well as a camper.

The class of campers with which this invention is to be compared includes those having a collapsible canopy which can be folded between a shelter-providing condition and a relatively compact condition for storage. Commonly, such campers include a wheeled frame which permits the campers to be pulled behind a vehicle between two sites and which provides a walled enclosure within with the canopy is maintained for storage and transport purposes. The enclosure provided by such a frame is typically low to the ground to reduce wind resistance as the camper is pulled along a road. Therefore, when pulled to and parked at a camping site, the canopy can be unfolded to a shelter-providing condition. Upon completion of its use as a shelter, the canopy can be returned to its folded condition within the enclosure for storage and transport purposes.

It is an object of the present invention to provide a new and improved camper and trailer combination which can be readily converted between a camper of the aforedescribed class and a utility trailer.

Another object of the present invention is to provide such a combination having a shelter-providing canopy which can be readily moved between shelter-providing and collapsed conditions.

Still another object of the present invention is to provide such a combination whose shelter-providing canopy resembles that of a Conestoga wagon when set up to a shelter-providing condition.

Yet another object of the present invention is to provide such a combination which is relatively uncomplicated in construction, yet effective in operation.

SUMMARY OF THE INVENTION

This invention resides in a camper and trailer combination.

The combination includes a wheeled frame including means for providing an open-topped, wheeled enclosure and a plurality of spars which span the open top of the enclosure. In addition, the combination includes a canopy which is positionable over the spars to cover the open top of the enclosure, and the spars are connected to the open-topped enclosure to permit a movement of the spars between an upright condition at which the canopy can be spread over and cover the spars and a collapsed, out-of-the-way condition.

BRIEF DESCRIPTION OF THE DRAWINGS

FIG. 6 is a cross-sectional view taken along line 6-6 of FIG. 4.

FIGS. 7-10 are side elevational views of slide members which join the spars to the guide rails of the FIG. 1 embodiment.

FIG. 11 is a perspective view of a locking pin which has been removed from a slide member of the FIG. 1 embodiment.

FIG. 12 is a fragmentary perspective view of one of the guide rails of the FIG. 1 embodiment.

FIG. 13 is a view of the pin of FIG. 11 and guide rail of FIG. 12 shown positioned in a condition which locks a slide member in a fixed position along the guide rail.

DETAILED DESCRIPTION OF AN ILLUSTRATIVE EMBODIMENT

Figure 1:
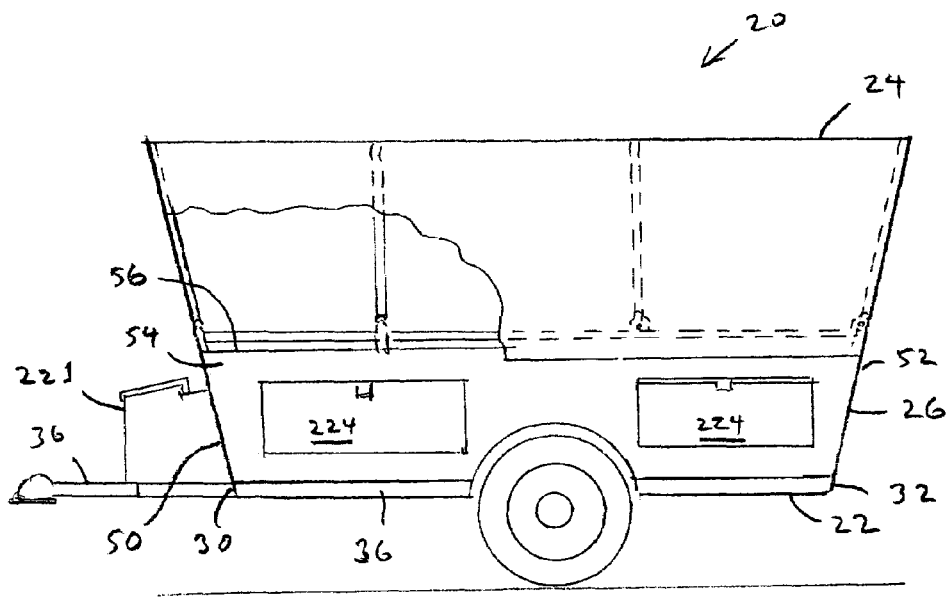
FIG. 1 is a side elevational view of an embodiment of the camper/trailer combination within which features of the present invention are embodied.
Figure 3:
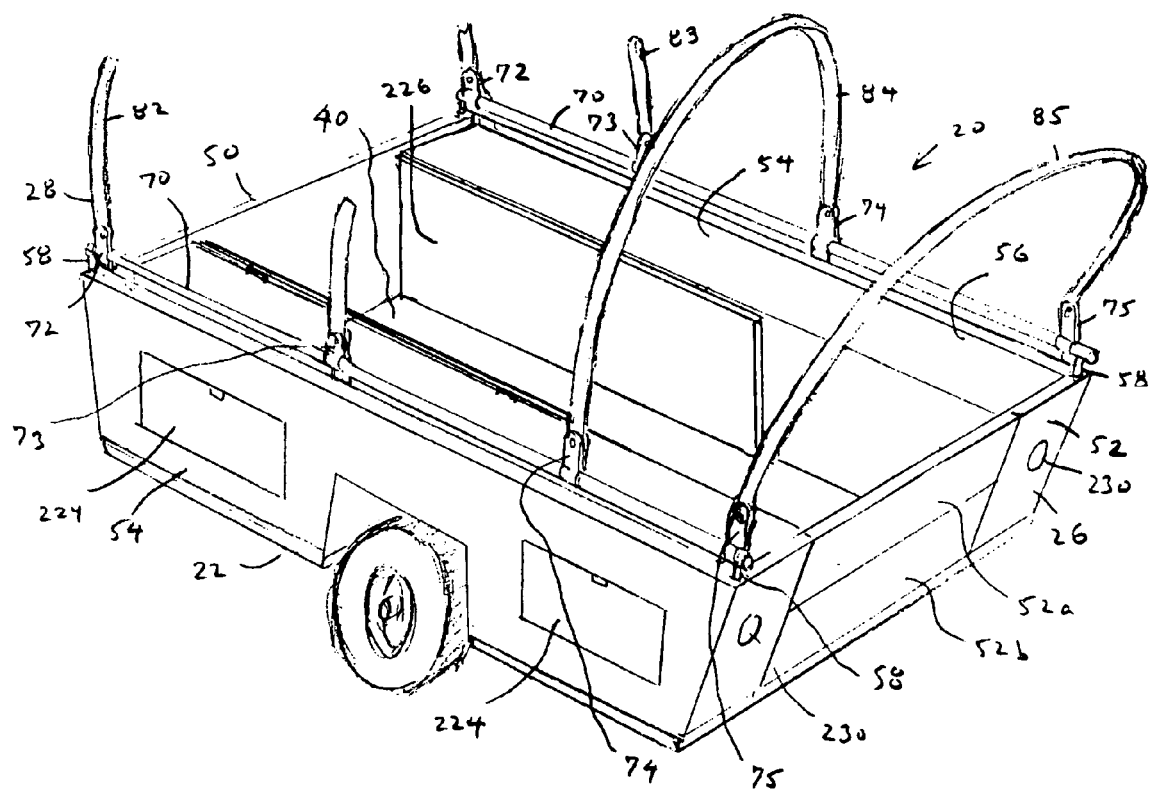
FIG. 3 is a perspective view, shown partially cut-away, of the open-topped enclosure of the FIG. 1 combination.
Figure 4:
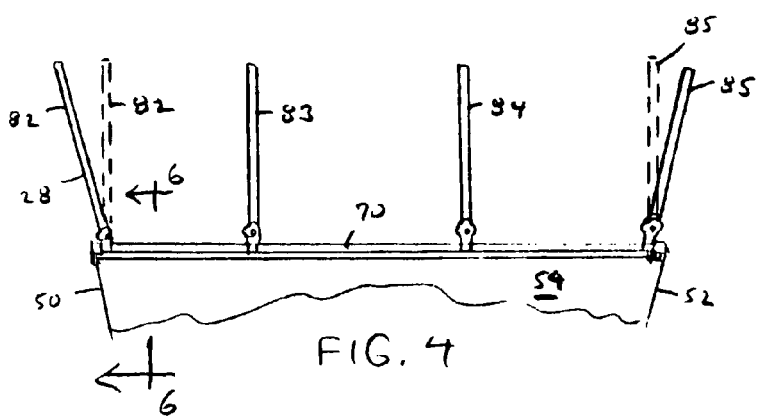
FIG. 4 is a fragmentary elevational view of the FIG. 1 embodiment shown without its canopy and illustrating the spars thereof when positioned in an upright condition.
Figure 5:
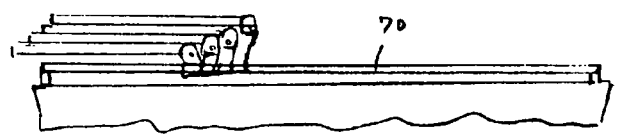
FIG. 5 is a view similar to that of FIG. 1 of the FIG. 1 embodiment but illustrating the spars of the FIG. 1 embodiment when positioned in a collapsed, out-of-the-way condition.

Turning now to the drawings in greater detail and considering first FIGS. 1-5, there is illustrated an embodiment, generally indicated 20, of a camper and trailer combination within which features of the present invention are embodied. The embodiment 20 includes a wheeled sub-frame, or frame 22, an open-topped enclosure 26 supported by the wheeled frame 22, a flexible canopy 24 arranged above the enclosure 26 and a collapsible frame assembly 28 attached to the enclosure 26 for supporting the flexible canopy 24 in a shelter-providing condition atop the enclosure 26. As will be apparent herein, the frame assembly 28 is capable of being moved from an upright condition for use at which the frame assembly 28 is capable of supporting the canopy 24 in a shelter-providing condition (as shown in FIG. 1) and a collapsed condition at which the frame assembly 28 is collapsed and positioned in an out-of-the-way condition (as shown in FIG. 5).

Figure 2:
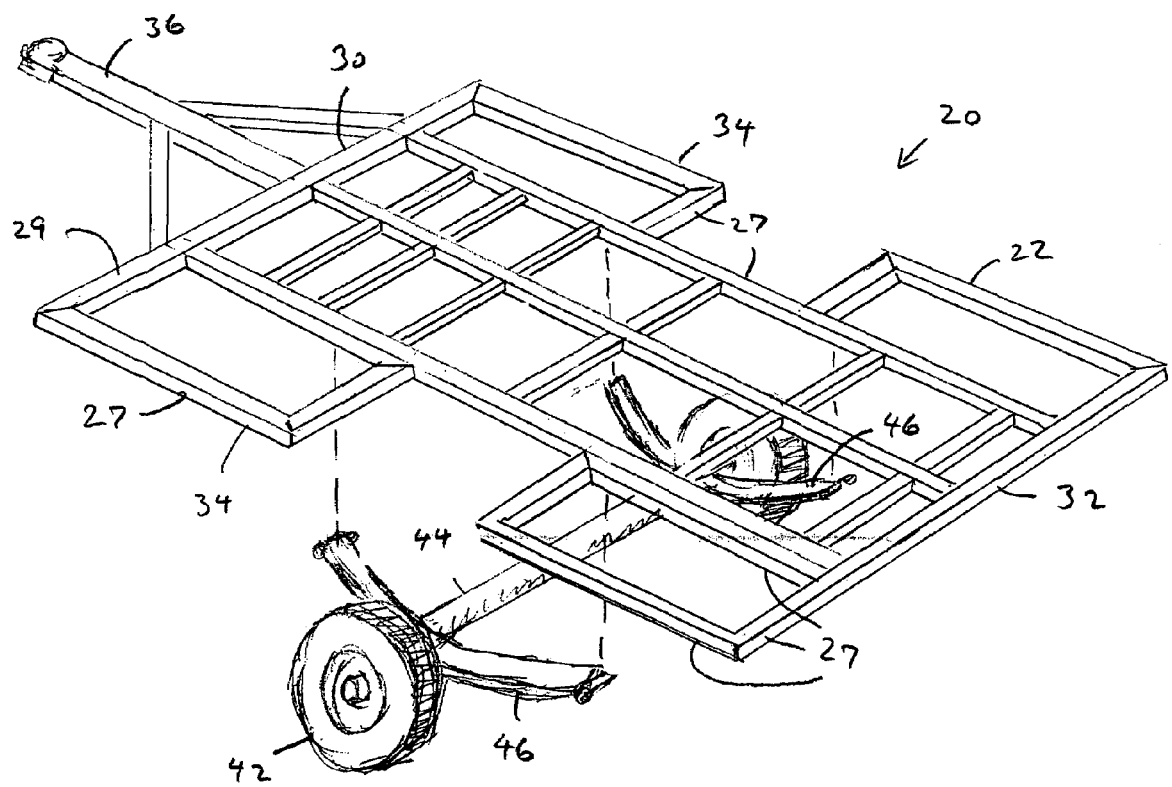
FIG. 2 is a perspective view of the wheeled sub-frame of the FIG. 1 embodiment.

As best seen in FIG. 2, the wheeled frame 22 includes a plurality of elongated members 27 (e.g. struts and braces) which are joined together to form a substantially planar platform 29 having a front 30, a back 32 and two opposite sides 34. In addition, a tongue member 36 is joined to the front 30 of the platform 29, and is adapted to interfit with a conventional ball-type connector of a trailer hitch (not shown) to enable the embodiment 20 to be pulled along the road by a vehicle. The elongated members 27 which comprise the components of the platform 29 are preferably constructed of metal, such as steel, and can be attached together with welds or bolts.

The platform 29 of the wheeled frame 22 defines an upper surface which is overlain with a piece of flooring 40 (FIG. 3) constructed, for example, of steel, which is fixedly secured in place, such as with welds or bolts, atop the platform 29. As will be apparent herein, the flooring 40 provides the floor for the interior of the camper/trailer embodiment 20.

The embodiment 20 also includes two wheels 42 which are joined at opposite ends of a single axle 44 (FIG. 2) which, in turn, is positioned beneath the platform 29 and extends between the two sides 34 of the platform 29. Preferably, leaf springs 46 are interposed between the under-side of the platform 29 and the axle 44 at positions adjacent the platform sides 34 to reduce the effects of any bouncing as the embodiment 20 is pulled along the road. It follows that the wheels 42 which are disposed on opposite sides of the platform 29 are free to rotate relative thereto as the wheels support the weight of the platform 29 through the leaf springs 46 and axle 44.

The enclosure 26 includes a front wall panel 50 joined to so as to extend upwardly from the front of the platform 29, a back wall panel 52 joined to so as to extend upwardly from the back of the platform 29 and two opposite side wall panels 54 joined to so as to extend upwardly from the sides of the platform 29. Collectively, the front panel 50, back panel 52 and side panels 54 provide a walled interior for the enclosure 26 having an open top 56.

Preferably, the back wall panel 52 includes multiple (e.g. two) sections 52*a*, 52*b* (FIG. 3) which extend between the two side wall panels 54 and are removable from the remainder of the enclosure 26 to provide access to the interior of the enclosure 26 through the back thereof. Furthermore and when removed from the remainder of the enclosure 26, the back panel sections 52*a*, 52*b* can be used as ramps which extend between the back edge of the platform flooring 40 and the ground to enable a wheeled item, such as a motorcycle, all-terrain vehicle or wheelchair to be rolled onto the platform flooring 40 from the ground.

With reference to FIGS. 3-5, the collapsible frame assembly 28 includes a pair of elongated guide rails 70 which are supported by struts 58 atop the side panels 54 thereof so as to extend substantially the full length of the side panels 54. Slidably mounted upon each guide rail 70 is a plurality of (i.e. four) slide members 72, 73, 74, 75 which are capable of being slidably moved along the length of the rails 70 from one end thereof to the other end thereof (i.e. between the front and back of the enclosure 26). The frame assembly 28 also includes a plurality of (i.e. four) arcuate C-shaped spars 82, 83, 84, 85 which extend across and are joined at each end to a corresponding pair of slide members 72, 73, 74 or 75. Each spar 82, 83, 84, 85 is comprised of a flat, thin piece of metal (e.g. steel) which is bent to form a C, and each spar has an opposite end which is joined to a corresponding slide member 72, 73, 74 or 75 so that the C formed by the spar spans the width of the enclosure 26.

With reference to FIGS. 6-10, each slide member 72, 73, 74 or 75 includes a body 90 having a lower portion 60 which is positioned upon a corresponding guide rail 70 for sliding movement therealong and an upper portion 62 which cooperates with an end of a corresponding spar 82, 83, 84 or 85 to secure the spar to the guide rail 70. In this connection, the lower portion 60 of each slide member body 90 includes a horizontally-extending opening, or gap 64, which opens forwardly and rearwardly of the slide member body 90 and which is slidably positioned upon a corresponding guide rail 70 for linear (i.e. forward or rearward) movement therealong. To accommodate the passage of a strut 58 therethrough, the gap 64 also opens out of the bottom of its slide member body 90 through a passageway 66, as best shown in FIG. 6, which extends along the length of the slide member body.

It follows from the foregoing that each of the slide members 72, 73, 74 or 75 can be moved along the length of the guide rails 70 to thereby position the slide member at alternative positions along the length of the enclosure 26. Accordingly and as will be apparent herein, each spar 82, 83, 84 or 85 can be positioned at alternative positions along the length of the guide rail 70 to thereby position the spar at an alternative position along the length of the enclosure 26 by sliding the corresponding slide members along the guide rails 70 to a desired position therealong. In this connection, it will be understood that as each spar 82, 83, 84 or 85 is moved along the length of the guide rails 70, the ends of the spar are moved in unison so that the C-shaped form of the spar is maintained in a plane oriented substantially perpendicular to each of the guide rails 70, and consequently, to the longitudinal axis of the enclosure 26.

It is a feature of the embodiment 20 that the spars 82, 83, 84 and 85 are capable of being moved from an upright condition at which the C-shaped form of the spars are disposed in substantially vertical (or near-vertical) planes for use, as illustrated in solid lines in FIG. 4, and a folded, out-of-the-way condition, as illustrated in FIG. 5, at which the spars are arranged in a stacked condition adjacent the front of the embodiment 20 for storage and to expose the interior of the enclosure 26 for use through the top thereof. To this end, each spar 82, 83, 84 or 85 cooperates with its corresponding slide member 72, 73, 74 or 75 (or, more particularly, the corresponding pairs of slide members disposed on opposite sides of the enclosure 26) to accommodate the pivotal movement of the spar from its upright (FIG. 4) position to the stacked, out-of-the-way condition of FIG. 5 at which the plane containing the C-shaped form of the spar is horizontally-disposed.

To attach the spars to the corresponding (pair of) slide members and as best seen in FIG. 6, each spar defines an opening 68 adjacent each end thereof, and the upper portion 62 of each slide member body 90 includes a bifricated portion 92 including a pair of forks 94, 96. The end of each spar is disposed between and is pivotally joined to the forks 94, 96 with a pivot pin (described herein) which accommodates the pivotal movement of the spar relative to the corresponding slide member between the FIGS. 4 and 5 positions, as described herein.

One of the slide members 72 to which one end of the forwardmost spar 82 is pivotally joined is illustrated in FIG. 7 and includes a bifricated portion 92*a* provided with a central opening 100 through which a pivot bolt 102 is secured to pivotally join the corresponding end of the spar 82 to the slide member 72 and three additional (sets of) openings 104, 106 and 108 corresponding with alternative positions at which the spar 82 can be held in a fixed position relative to the slide member 72 by way of a removable pin 110 (FIG. 6). To this end and for purposes of accepting the removable pin 110, the end of the spar 82 which is positioned between the forks 94, 96 includes a opening which can be aligned with one of the (sets of) the openings 104, 106 or 108 by pivoting the spar 82 about the pivot bolt 102 until the spar opening is positioned in registry with one of the (sets of) openings 104, 106 or 108. More specifically, by pivoting the spar 82 about the pivot bolt 102 and securing the spar 82 within opening 104 (by inserting the pin 110 through the aligned spar opening and opening 104), the spar 82 is secured in its horizontally-disposed, out-of-the-way condition, as illustrated in phantom in FIG. 7. Similarly, by pivoting the spar 82 about the pivot bolt 102 and securing the spar 82 within opening 106 (by inserting the pin 110 through the aligned spar opening and opening 106), the spar 82 is secured in its upright (near-vertical) condition for use, as illustrated in solid lines in FIG. 7. The remaining opening 108 permits the spar 82 to be secured in a true vertical orientation to facilitate set-up of the embodiment 20 for use as a camper, as is described in greater detail herein.

Along the same lines, each slide member 75 to which the rearwardmost spar 85 is pivotally joined is illustrated in FIG. 8 and includes a bifricated portion 92*d* provided with a central opening 120 through which a pivot bolt 122 is secured to pivotally join the corresponding end of the spar 85 to the slide member 75 and three additional (sets of) openings 124, 126 and 128 corresponding with alternative positions within which the spar 85 can be held in a fixed position relative to the slide member 75 with a removable pin 110 (FIG. 6). Again and for purposes of accepting the removable pin 110, the spar 85 includes an opening which can be aligned with a corresponding opening 124, 126 or 128 by pivoting the spar 85 about the pivot bolt 122 until the spar opening is positioned in registry with the (set of) openings 124, 126 or 128. More specifically, by pivoting the spar 85 about the pivot bolt 122 and securing the spar 85 within the (sets of) opening 124 (by inserting the pin 110 through the aligned spar opening and openings 124), the spar 85 is secured in its horizontally-disposed, out-of-the-way condition, as illustrated in phantom in FIG. 8. Similarly, by pivoting the spar 85 about the pivot bolt 122 and securing the spar 85 within opening 126 (by inserting the pin 110 through the aligned spar opening and the sets of opening 126), the spar 85 is secured in its upright (near-vertical) condition for use, as illustrated in solid lines in FIG. 8. As is the case with the (sets of) openings 108 of the FIG. 7 slide member 72, the (sets of) openings 128 of the FIG. 8 slide member 75 permits the spar 85 to be releasably held in a true vertical orientation to facilitate the positioning of the canopy 24 in place over the spars.

By comparison and with reference to the slide members to which the middle-most spars 83, 84 are pivotally joined are illustrated in FIGS. 9 and 10 and includes a bifricated portion 92b or 92c provided with a central opening 140 or 160 through which a pivot bolt 142 or 162 is secured to pivotally join the corresponding end of the spar 83 or 84 to the slide member 73 or 74 and two additional (sets of) openings 144 (or 164) and 146 (or 166) within which the spar 83 or 84 can be held in a fixed position relative to the slide member 73 or 74 with a removable pin 110 (FIG. 6). Again and for purposes of accepting the removable pin 110, each spar 83 or 84 includes an opening which can be aligned with a corresponding set of openings 144 (or 164) or 146 (or 166) by pivoting the spar 83 or 84 about the pivot bolt 142 (or 162) until the spar opening is positioned in registry with the corresponding set of openings 144 (or 164) or 146 (or 162). More specifically, by pivoting the spar 83 or 84 about the pivot bolt 142 or 162 and securing the spar 83 or 84 within opening 144 or 164 (by inserting the pin 110 through the aligned spar opening and opening 144 or 162), the spar 83 or 84 is secured in its horizontally-disposed, out-of-the-way condition, as illustrated in phantom in FIG. 9 or 10. Similarly, by pivoting the spar 83 or 84 about the pivot bolt 142 or 162 and securing the spar 83 or 84 within opening 146 or 166 (by inserting the pin 110 through the aligned spar opening and sets of openings 146 or 166), the spar 83 or 84 is secured in its upright (vertical) condition for use, as illustrated in solid lines in FIGS. 9 or 10.

To enable each slide member 72, 73, 74 or 75 to be secured in place along its corresponding guide rail 70 and with reference to FIGS. 11-13, each guide rail 70 is provided with a series of shallow notches 200 (only one shown in FIG. 12) at regularly-spaced positions therealong at which the spars 72, 73, 74 and 75 are desired to be positioned for supporting the canopy 24 for use of the embodiment 20 as a camper, and a pin 202 is rotatably received through aligned openings provided in each slide member 82, 83, 84 and 85 for cooperatively securing the slide member 82, 83, 84 or 85 in a fixed position along the length of the guide rail 70. More specifically, the pin 202 has a head 204 and a shank 206 joined to the head 204 which includes a semi-circular-shaped notch 208. The notch 208 is sized so that when the pin 202 is rotated within its corresponding slide member to a position at which the notch 208 faces downwardly, the surface of the notch 208 is spaced from the guide rail 70 so that the slide member (and corresponding spar) can be freely moved (i.e. slid) along the length of the guide rail 70.

However, by positioning the slide member 82, 83, 84 or 85 in its desired position along the length of its guide rail 70 at which the slide member 82, 83, 84 or 85 is positioned directly over the corresponding shallow notch 200 provided in the guide rail 70, the pin 202 can be rotated (to the position illustrated in FIG. 13) at which the shank 206 of the pin 202 is accepted by the rail notch 200. With the shank 206 accepted by the notch 208 in this manner, the slide member is locked in position along the length of the guide rail 70. To unlock the slide member from its locked position, the pin 202 is simply rotated until its notch 208 faces downwardly, thereby permitting the slide member to again be slidably moved along the length of the rail 70. It follows that the shank 208 of the pin 202 is slightly smaller than the diameter of the opening provided in the slide member to permit rotation of the pin 202 within its slide member opening, and that the pin 202 can be secured in place through its slide member opening with a key 210 (FIG. 6) secured within an end of the pin 202.

It follows from the foregoing that to move, for example, the spars 82, 83, 84, 85 from the horizontally-disposed, out-of-the-way condition illustrated in FIG. 5 for storage purposes to the upright condition illustrated in FIG. 4 for supporting the canopy in a shelter-providing condition, the spars 82, 83, 84 and 85, and associated slide members 72, 73, 74 and 75 are slidably moved along the length of the guide rails 70 until each slide member is positioned directly over a corresponding notch 200 provided along the rails 70, and then the pins 202 are rotated so that the shanks 208 thereof are accepted by the corresponding notch 200 to thereby lock the slide member 72, 73, 74 or 75 in a fixed position along the guide rail 70. Accordingly, the notches 200 are defined at locations along the guide rails 70 at which the spars 82, 83, 84 and 85 are desired to be positioned in the upright (FIG. 4 solid-line) position. Once the slide members 72, 73, 74 and 75 are locked in the desired position along the rails 70, the pins 110 are removed from the slide members so that each spar 82, 83, 84 and 85 can be raised to its vertical (or near-vertical) position for supporting the canopy 24 in its shelter-providing condition. When positioned in its vertical (or near-vertical) orientation of choice, the pins 110 are replaced within the appropriate aligned openings provided in the bifricated portions 92 of the slide members and the spar ends. Each pin 110 can be releasably secured in place within the slide member with a key 212 (FIG. 6).

To collapse the spars from the upright condition, the pins 110 are removed from each slide member 72, 73, 74 or 75 to permit the spars 82, 83, 84 and 85 to be returned to the horizontally-disposed position and then re-secured in the horizontally-disposed position with the pins 110. The pins 202 are then rotated to the (unlocked) position at which the slide members can be slidably moved along the guide rails 70 to the position illustrated in FIG. 5 at which the spars are in a stacked relationship adjacent the front of the enclosure 26. To facilitate the formation of the FIG. 5 stacked relationship of the spars and as illustrate in FIGS. 7-10, the height of the slide member 72 is slightly shorter than that of the slide member 73, the height of the slide member 73 is slightly shorter than the that of the slide member 74, and the height of the slide member 74 is slightly shorter than that of the slide member 75. Therefore, when the slide members 72, 73, 74 and 75 are grouped together in the manner illustrated in FIG. 5, the spars 82, 83, 84 and 85 are positioned in a compact, superposed relationship.

Figure 14:
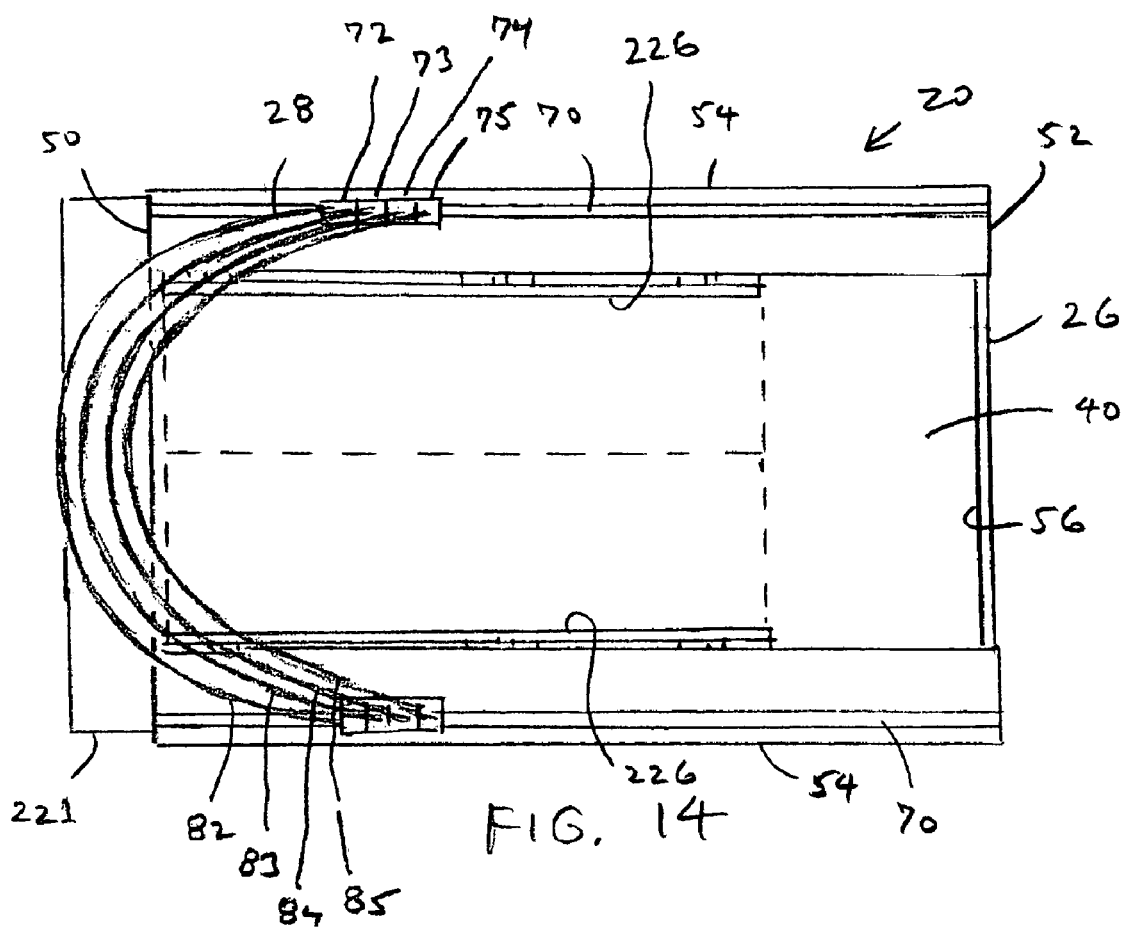
FIG. 14 is a top plan view of the FIG. 1 embodiment as seen from above in FIG. 5.

With reference to FIG. 14 and when the spars 82, 83, 84 and 85 are positioned in the horizontally-disposed, out-of-the-way position (as illustrated in FIG. 5) adjacent the front of the enclosure 26, the majority of the floor space of the interior of the enclosure 26 is accessible for use. More specifically, when positioned in the out-of-the-way condition as illustrated in FIG. 14, the spars 82, 83, 84 and 85 do not interfere with the access to or usage of the interior of the enclosure 26. Consequently, substantially the entire interior of the enclosure 26 is available for usage of the embodiment 20 as a utility trailer. As mentioned earlier, with the back panel sections 52a, 52b (FIG. 3) removed from the remainder of the enclosure 26, access to the interior of the enclosure 26 can be had through the back of the enclosure 26.

Figure 15:
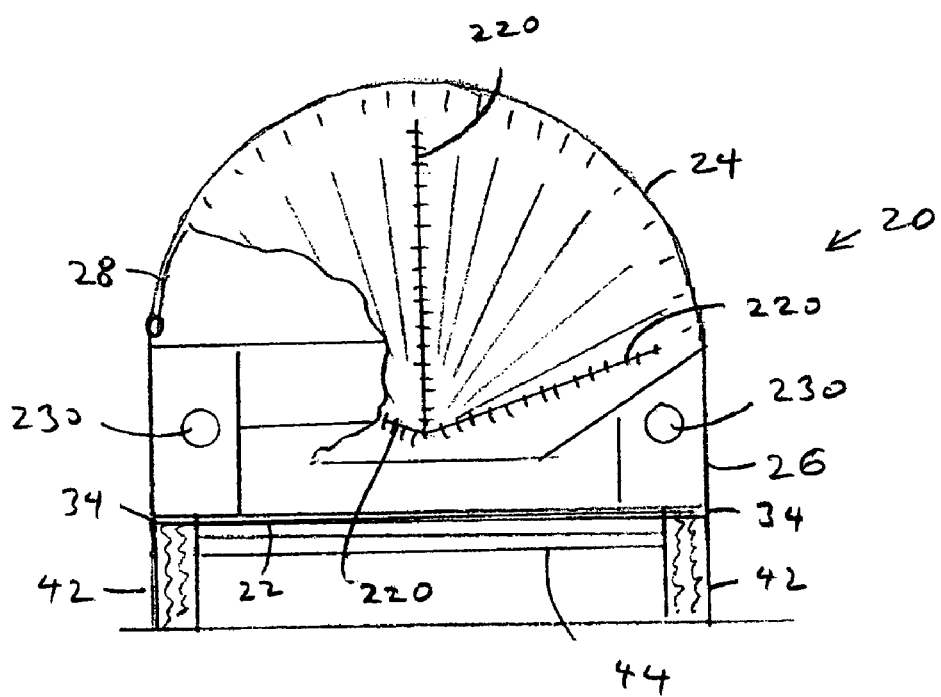
FIG. 15 is an end elevational view of the FIG. 1 embodiment, shown partially cut-away and as seen from the right in FIG. 1.

With reference to FIGS. 1 and 15, the flexible canopy 24 is shaped to provide a relatively snug fit when positioned over the spars 82, 83, 84 and 85. To this end, the canopy 24 is shaped to resemble the canopy of a Conestoga wagon and has been provided with a plurality of zippered sections 220 which can be zipped or unzipped, as desired, to, for example, enable the canopy to be spread upon the ground and folded or rolled to a compact condition for storage or to facilitate the positioning of the canopy 24 across the spars 82, 83, 84, 85 during set-up of the embodiment 20 for use as a camper. For example and as mentioned earlier, when each of the spars 82, 83, 84 and 85 are positioned (and secured) in a true vertical position, the canopy 24 can be spread over the spars more easily than would be the case if the spars were positioned in the solid-line position of FIG. 4. Furthermore, the ease with which the canopy 24 can be spread over the spars can be further facilitated by unzipping the zipper sections 220 (to an opened condition) before the canopy 24 is spread over the spars. Once the canopy 24 is positioned over the spars in the desired manner, the forwardmost and rearwardmost spars 82 and 85 can thereafter be pushed to their outward, near-vertical position as illustrated in solid lines in FIG. 4, and then the zippered sections 220 can be re-zipped to a closed condition.

The flexible canopy 24 is preferably comprised of a rubber-covered nylon material, but other materials can be used.

The embodiment 20 provides a further advantage in that it includes a number of storage compartments embodied in and around the enclosure 26. For example, one storage container 221 (suitable for storage of the canopy 24, when the canopy is folded or rolled to a compact condition) is mounted on the front of the enclosure 26 forwardly of the interior thereof. Furthermore, compartment regions can be incorporated within the sides of the enclosure 26 and which are accessible through a pairs of doors 224 provided in the side wall panels 54 thereof. If desired, a pair of bed panels 226 can be hingedly mounted upon the interior surface of the side wall panels 54 for movement between a stored condition and a folded-out condition for use.

The embodiment 20 can include additional features which render the embodiment 20 more road-worthy. For example, taillights 230 (FIG. 15) can be embodied within the back of the enclosure 26, and appropriate wiring can be routed between the taillights 230 and the front of the embodiment 20 to enable the taillights 230 to receive electrical power from a vehicle (not shown) adapted to pull the embodiment 20 along a road.

It will be understood that numerous modifications and substitutions can be had to the aforedescribed embodiment without departing from the spirit of the invention. For example, although the aforedescribed embodiment 20 has been shown and described as including a removable pin 202 which is completely removable from its corresponding slide member before it is repositioned therein for securing the corresponding spar 82, 83, 84 or 85 at an alternative location along the rails 70, the pin can be attached to the slide member, and a spring can be cooperatively joined thereto to spring-bias the spring from a withdrawn position toward a fully-inserted position. Accordingly, the aforedescribed embodiment 20 is intended for the purpose of illustration and not as limitation.

The invention claimed is:

1. A camper and trailer combination comprising:
   an open-topped, wheeled enclosure having an open top and including a front and a back and two opposite sides which extend between the front and the back and wherein said two opposite sides include one opposite side and another opposite side;
   at least three spars which extend between the two opposite sides of the enclosure and span the open top of the enclosure and each of said spars having two opposite ends, one end of said opposite ends being arranged adjacent said one opposite side of the enclosure and the other of said opposite ends being arranged adjacent said another opposite side of the enclosure; and
   a canopy which is positionable over the spars to cover the open top of the enclosure;
   a pair of guide rails which are connected to the enclosure so as to extend along the two opposite sides thereof wherein one of the guide rails of said pair of guide rails extends along said one opposite side of the enclosure and between the front and the back thereof and the other of the guide rails of said pair of guide rails extends along said another opposite side of the enclosure and between the front and the back thereof;
   at least three slide members which are mounted upon one of the guide rails for sliding movement therealong and at least three slide members which are mounted upon the other of the guide rails for sliding movement therealong; and
   one of the two opposite ends of each spar being connected to a corresponding one of said slide members which is slidably mounted upon said one of said pair of guide rails and the other of the two opposite ends of each spar being connected to another corresponding one of said slide members which is slidably mounted upon said other of said pair of guide rails so that each spar can be moved along the opposite sides of the enclosure as the slide members to which the spar is connected are slidably moved along said pair of guide rails and so that each spar can be moved independently of the other spars of the at least three spars to accommodate the positioning of the ends of the spars at desired locations and at desired spacings along said pair of guide rails;
   each spar being pivotally connected to the slide members to which the spar is connected to permit a pivotal movement of the spar through about ninety degrees of movement between an upright condition at which the spar is disposed in a vertical orientation and at which the canopy can be spread over and cover the spars and a collapsed, out-of-the-way condition at which the spar is disposed substantially horizontally; and
   means associated with each slide member for releasably securing the spar to which the slide member is connected in either its upright condition or its collapsed condition.

2. The combination of claim 1 wherein the back of the enclosure includes a section which is adapted to be moved relative to the remainder of the enclosure into and out of a condition at which access is provided to the interior of the open-topped enclosure.

3. The combination of claim 1 wherein the spars are connected to the enclosure to permit sliding movement relative thereto and along the guide rails toward and away from the front of the enclosure.

4. The combination of claim 3 wherein each spar is arranged in a plane.

5. A camper and trailer combination comprising:

a wheeled frame including an open-topped enclosure having an open top and including a front and a back and two opposite sides which extend between the front and the back and wherein the two opposite sides include one opposite side and another opposite side;

at least three spars which span the open top of the enclosure and which extend between the two opposite sides of the enclosure and wherein each spar is arranged in a plane, and each of said spars having two opposite ends, one end of said opposite ends being arranged adjacent said one opposite side of the enclosure and the other of said opposite ends being arranged adjacent said another side of the enclosure; and a canopy which is positionable over the spars to cover the open top of the enclosure;

a pair of guide rails which are connected to the enclosure so as to extend along the two opposite sides thereof wherein one of the guide rails of said pair of guide rails extends along said one opposite side of the enclosure and between the front and the back thereof and the other of the guide rails of said pair of guide rails extends along said another opposite side of the enclosure and between the front and the back thereof;

at least three slide members which are mounted upon one of the guide rails for sliding movement therealong and at least three slide members which are mounted upon the other of the guide rails for sliding movement therealong; and one of the two opposite ends of each spar being connected to a corresponding one of said slide members which is slidably mounted upon said one of said pair of guide rails and the other of the two opposite ends of each spar to another corresponding one of said slide members which is slidably mounted upon said other of said pair of guide rails so that each spar can be moved along the opposite sides of the enclosure as the slide members to which the spar is connected are slidably moved along said pair of guide rails and so that each spar can be moved independently of the other spars of the at least three spars to accommodate the positioning of the ends of the spars at desired locations and desired spacings along said pair of guide rails;

each spar being pivotally connected to the slide members to which it is connected to permit a pivotal movement of the spar through about ninety degrees of pivot between an upright condition at which the plane of the spar is arranged in a vertical orientation and at which the canopy can be spread over and cover the spars to thereby cover the open top of the enclosure and a collapsed, out-of-the-way condition at which the plane of each spar is arranged in a substantially horizontal orientation and to thereby uncover the open top of the enclosure; and means associated with each slide member for releasably securing the spar to which the slide member is connected in either the upright condition or the collapsed condition.

6. The combination of claim 5 wherein each spar is substantially C-shaped in form.

7. A camper and trailer combination comprising:

a frame having two opposite sides;

two wheels mounted for rotation upon the opposite sides of the frame to permit the frame to be moved along a roadway as the wheels move in rolling engagement with the roadway;

an open-topped enclosure having an open top and including a front and a back and two opposite sides which extend between the front and the back a canopy for covering the open top of the open-topped enclosure; and at least three spars which extend between the two opposite sides of the enclosure and span the open top of the open-topped enclosure for supporting the canopy thereover, and each of said spars having two opposite ends, one end of said opposite ends being arranged adjacent one of said opposite sides of the enclosure and the other of said opposite ends being arranged adjacent the other of said opposite sides of the enclosure;

a pair of guide rails which are connected to the enclosure so as to extend along the two opposite sides thereof wherein one of the guide rails of said pair of guide rails extends along one of said opposite sides of the enclosure and between the front and the back thereof and the other of the guide rails of said pair of guide rails extends along the other of said opposite sides of the enclosure and between the front and the back thereof;

at least three slide members which are mounted upon one of the guide rails for sliding movement therealong and at least three slide members which are mounted upon the other of the guide rails for sliding movement therealong; and one of the two opposite ends of each spar being connected to a corresponding one of said slide members which is slidably mounted upon said one of said pair of guide rails and the other of the two opposite ends of each spar being connected to another corresponding one of said slide members member which is slidably mounted upon said other of said pair of guide rails so that each spar can be moved along the opposite sides of the enclosure as the slide members to which the spar is connected are slidably moved along said pair of guide rails and so that each spar can be moved independently of the other spars of the at least three spars to accommodate the positioning of the ends of the spars at desired locations and at desired spacings along said pair of guide rails;

each spar being pivotally connected to the slide members to which the spar is connected to accommodate a pivotal movement of the spar relative thereto through about ninety degrees of pivot between an upright condition at which the spar is oriented in a vertical disposition and at which the canopy can be spread over the spars to thereby cover the open top of the open-topped enclosure and a collapsed, out-of-the-way condition at which the spar is disposed in a substantially horizontal disposition and at which the open top of the enclosure is uncovered; and means associated with each slide member for releasably securing the spar to which the slide member is connected in either the upright condition or the collapsed condition.

8. The combination of claim 1 wherein each of the at least three spars is substantially arranged in a plane, one of the at least three spars is situated closer to the front of the open-topped enclosure than any of the other of the at least three spars, and the means associated with the slide members for releasably securing is adapted to selectively and releasably secure said one of the at least three spars in either a first condition at which the plane of said one of the at least three spars is disposed in a true vertical orientation or a second condition at which the plane of said one of the at least three spars is oriented at a relatively small angle with respect to the true vertical orientation to facilitate the positioning of the canopy across the spars and the removal of the canopy from the spars.

9. The combination as defined in claim 8 wherein the means for selectively and releasably securing includes a pin for releasably pinning said one of said plurality of spars in either its said first condition or its said second condition.

10. The combination of claim 8 wherein another of the at least three spars is situated closer to the back of the open-topped enclosure than any of the other of the at least three spars, and the combination further includes means associated with the slide members to which said another of the at least three spars is connected for selectively and releasably securing said another of the at least three spars in either one condition at which the plane of said another of the at least three spars is disposed in a true vertical orientation or another condition at which the plane of said another of the at least three spars is oriented at a relatively small angle with respect to the true vertical orientation to further facilitate the positioning of the canopy across the spars and the removal of the canopy from the spars.

11. The combination as defined in claim 10 wherein the means for selectively and releasably securing includes a pin for releasably pinning said one of said plurality of spars in either its said first or second conditions and a pin for releasably pinning said another of said plurality of spars in either its said one condition or its said another condition.

12. The combination of claim 1 wherein each of the at least three spars is substantially arranged in a plane, a first of the at least three spars is situated closer to the back of the open-topped enclosure than any of the other of the at least three spars, and the combination further includes means associated with the slide members to which said first of the at least three spars is connected for selectively and releasably securing said first of the at least three spars in either one condition at which the plane of said first of the at least three spars is disposed in a true vertical orientation or another condition at which the plane of said first of the at least three spars is oriented at a relatively small angle with respect to the true vertical orientation to facilitate the positioning of the canopy across the spars and the removal of the canopy from the spars.

13. The combination as defined in claim 12 wherein the means for selectively and releasably securing includes a pin for releasably pinning said first of said at least three spars in either its said one condition or its said another condition.

* * * * *